(12) United States Patent
Agostini

(10) Patent No.: US 9,395,837 B2
(45) Date of Patent: Jul. 19, 2016

(54) MANAGEMENT OF DATA IN AN ELECTRONIC DEVICE

(71) Applicant: Your Voice S.p.a., Milan (IT)

(72) Inventor: Luca Agostini, Milan (IT)

(73) Assignee: Your Voice S.P.A., Milan (IT)

( * ) Notice: Subject to any disclaimer, the term of this patent is extended or adjusted under 35 U.S.C. 154(b) by 201 days.

(21) Appl. No.: 14/042,193

(22) Filed: Sep. 30, 2013

(65) Prior Publication Data

US 2015/0091813 A1    Apr. 2, 2015

(51) Int. Cl.
*G06F 3/041* (2006.01)
*H04M 1/725* (2006.01)

(52) U.S. Cl.
CPC ............ *G06F 3/0412* (2013.01); *G06F 3/0416* (2013.01); *H04M 1/72519* (2013.01); *H04M 2250/22* (2013.01)

(58) Field of Classification Search
USPC ........................................... 345/145; 715/752
See application file for complete search history.

(56) References Cited

U.S. PATENT DOCUMENTS

| | | | | |
|---|---|---|---|---|
| 2011/0255748 A1* | 10/2011 | Komoto | ................ | G06T 7/2033 382/103 |
| 2013/0047110 A1* | 2/2013 | Shimizu | ................ | G06F 3/0486 715/769 |
| 2013/0050267 A1* | 2/2013 | Miyamoto | ............... | G09G 5/14 345/660 |
| 2014/0015808 A1* | 1/2014 | Palm | ....................... | G06F 3/043 345/177 |
| 2014/0059492 A1* | 2/2014 | Hashida | ................ | G06F 3/0482 715/835 |
| 2014/0149942 A1* | 5/2014 | Wood-Salomon | .... | G06F 3/0482 715/840 |
| 2014/0232648 A1* | 8/2014 | Park | ....................... | G06F 3/0483 345/156 |
| 2014/0267072 A1* | 9/2014 | Andersson | .......... | G06F 3/04883 345/173 |
| 2014/0282233 A1* | 9/2014 | Sandler | ................ | G06F 3/0484 715/800 |
| 2014/0320425 A1* | 10/2014 | Jeong | .................... | G06F 3/1454 345/173 |
| 2015/0026590 A1* | 1/2015 | Shirzadi | .................. | G06F 3/017 715/751 |
| 2015/0026592 A1* | 1/2015 | Mohammed | ........ | G06F 3/04847 715/752 |
| 2015/0035772 A1* | 2/2015 | Asahara | .................. | B63B 49/00 345/173 |

* cited by examiner

*Primary Examiner* — Kumar Patel
*Assistant Examiner* — Vinh Lam
(74) *Attorney, Agent, or Firm* — Workman Nydegger

(57) ABSTRACT

An electronic device (1) includes: a touch-screen display (10); a memory (20) storing a plurality of categories of information sources, each category associated with respective notification data; a processing unit (30) configured to: display in a first position (P1) an item (X) representative of a determined source of information; determine a reference position (RP) on said display (10); detect a gesture (G) applied to the item (X) from the first position (P1) to a second position (P2); associate the determined source of information to one category, based on the second position (P2); a receiving module (RM) for receiving information and source data representative of a transmitting source of the information. If the transmitting source is the determined source the processing unit (30) selects the notification data associated with the category of the determined source and generates a notification signal based on the selected notification data.

16 Claims, 11 Drawing Sheets

| F1 | F2 | F3 | F4 |
|---|---|---|---|
| Category C1 | 1 | Notification Data ND1 | D1 |
| Category C2 | 2 | Notification Data ND2 | D2 |
| Category C3 | 3 | Notification Data ND3 | D3 |
| Category C4 | 4 | Notification Data ND4 | D4 |
| Category C5 | 5 | Notification Data ND5 | D5 |
| Category C6 | 6 | Notification Data ND6 | D6 |

| Source S1 | Category C3 |
|---|---|
| Source S2 | Category C1 |
| Source S3 | Category C4 |

FIG. 8

| D1up | D1 |
|------|----|
| D2up | D2 |
| D3up | D3 |
| D1down | D4 |
| D2down | D5 |
| D3down | D6 |

FIG. 10

MANAGEMENT OF DATA IN AN ELECTRONIC DEVICE

BACKGROUND OF THE INVENTION

1. Field of the Invention

The present invention refers to the management of data in an electronic device.

2. State of the Art

As known, mobile phones, especially the so called smart phones, are provided with connection capabilities which allow the reception of information/data by means of different channels and different technologies.

The Applicant has noted that currently no tools are available that permit management of the received data in an easy, reliable and intuitive way.

SUMMARY OF THE INVENTION

It is an object of the present invention to provide an easy, user-friendly and reliable way to manage data received by an electronic device provided with connection capabilities, and in particular by a smart phone.

Another object of the present invention is to provide a fancy and intuitive way to manage data received by an electronic device provided with connection capabilities, through which the user can easily handle large amounts of data.

These and other objects are substantially achieved by an electronic device according to the present invention.

BRIEF DESCRIPTION OF THE DRAWINGS

Further features and advantages will become more apparent from the detailed description of preferred and non exclusive embodiments of the invention. The description is provided hereinafter with reference to the attached drawings, which are presented by way of non limiting example, wherein:

FIGS. 7, 8, 10 show possible data structures according to the invention; and

DETAILED DESCRIPTION OF THE OF PREFERRED EMBODIMENT

Figure 1:
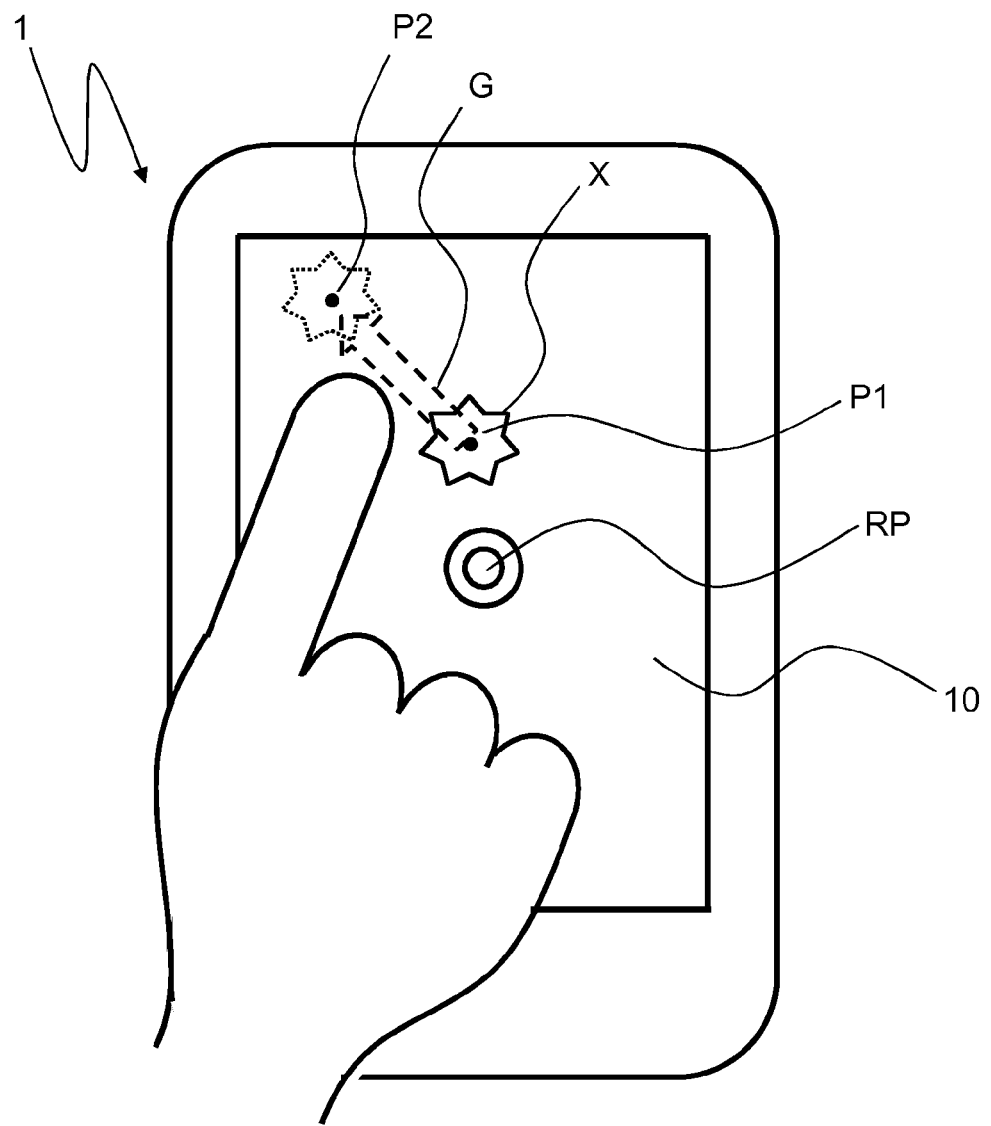
FIG. 1 schematically shows a pictorial representation of an electronic device according to the present invention and a gesture performed thereon.
Figure 2:
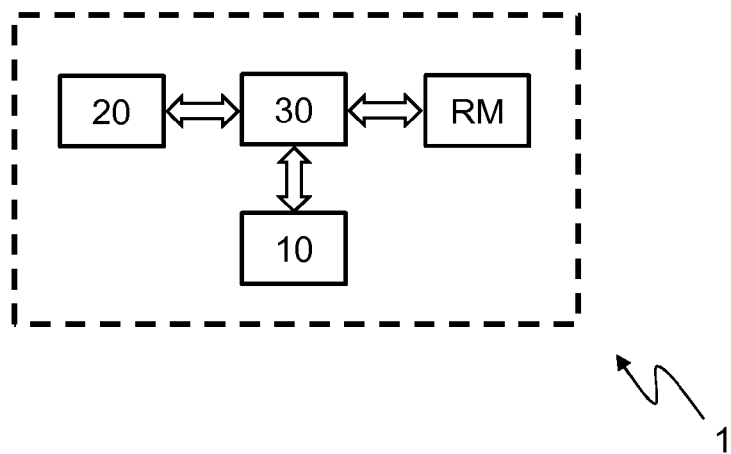
FIG. 2 shows a block diagram representative of the electronic device of FIG. 1.
Figure 3:
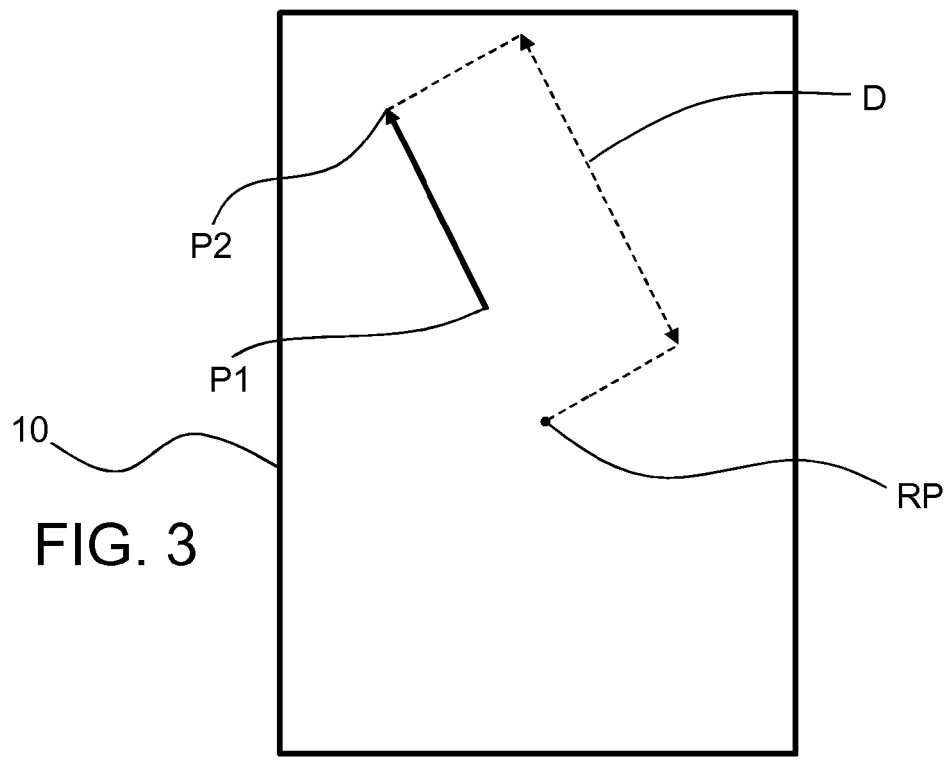
FIGS. 3 and 4 schematically show geometrical details of the data management technique according to the present invention.

In the accompanying drawings reference numeral 1 indicates an electronic device according to the present invention.

The electronic device 1 is preferably a portable or mobile device. For example the electronic device 1 can be a mobile phone, and in particular a so-called smart phone, or a tablet.

The electronic device 1 comprises a touch-screen display 10.

By means of the touch-screen capabilities of display 10 the device 1 is able to detect the position in which a user touches the display and the possible trajectory designed by the user moving his/her finger while it is in contact with the surface of the display.

Of course parts of the body other than fingers can be used, although fingers are the most commonly employed.

This technology is per se well known and will not be disclosed in further detail.

The electronic device 1 comprises a memory 20 configured to store data representative of a plurality of categories of sources of information. The sources of information can be, for example, other electronic devices/apparatuses, possibly associated with users/owners thereof, which can send data/information to the electronic device 1. Other possible sources of information can be websites and/or web services (such as, for example, news services provided by online newspapers or magazines) which, based on some agreement or subscription, send data/information to the electronic device 1. The categories in which the sources are divided can be related, for example, to the extent to which the source can be considered important/interesting by the user. By means of the technique discloses herein, the user can easily and quickly set the importance/interest of each source.

Preferably, each of said category is associated with a respective rating value representative of a rating attributed to each of said categories. Thus each category can be associated to a rating value which is included, for example, between "1" and "6", wherein "1" identifies the most important/interesting source(s), while "6" identifies the least important/interesting source(s).

Advantageously each category is associated with respective notification data ND1-ND6. As will become more clear in the following, the notification data ND1-ND6 are used to notify the user that information has been received from a source belonging to a determined category.

FIG. 7 schematically shows an example of a possible logic structure of memory 20: a number of records R are stored, each comprising: a first field F1 in which a data item representative of a category is stored; a second field F2 in which the rating value associated with the category is stored; a third field F3 in which notification data ND1-ND6, associated with the category, are stored.

The electronic device 1 comprises a processing unit 30. Preferably the processing unit 30 manages the overall functioning of the electronic device 1.

Preferably, given a determined source of information, the processing unit 30 cooperates with the touch-screen display 10 for displaying in a first position P1 on said display 10 an item X representative of said determined source of information (FIG. 1).

For example the item X can be an icon, a sign, a graphic symbol, a group of characters which is/are associated to the determined source of information so that the user, when looking at the item X, recalls the determined source of information.

The processing unit 30 is configured to determine a reference position RP on the display 10. In one embodiment, the reference position RP can be determined as the geometrical center of the display 10, or the geometrical center of a window shown on the same display.

Preferably a reference item is displayed at the reference position RP, so as to clearly identify the same.

The processing unit 30 is also configured to cooperate with the display 10 to detect a gesture G applied to the item X.

The gesture G is applied by the user, for example by means of one of his/her fingers. Of course also other parts of the body can be used. However, the most practical and simple is the use of a finger.

The gesture G is recognized by the processing unit 30 cooperating with the touch-screen capabilities of the display 10.

The gesture G defines, on the display 10, a trajectory which starts in the first position P1, i.e., the initial position of the item X, and ends in a second position P2 of the display 10.

This means that the user touches the screen at the first position P1 and, keeping the finger (or, in general, the involved part of his/her body) in contact with the display, moves said finger on the display, i.e., the user changes in time the position in which he/she is touching the screen, until the second position P2 is reached.

In practical terms the trajectory of the gesture G is defined by the substantially continuous sequence of positions in which, in time, the finger of the user contacts the touch-screen display 10 starting from the first position P1 and ending in the second position P2.

The gesture G can be, for example, a drag gesture. The gesture G can also be a swipe gesture or a flick gesture. In general the gesture G can be any gesture that allow the user to modify the position of the item X on the display 10 by touching the same display.

The processing unit 30 is configured to cooperate with the display 10 to move the item X along the trajectory defined by the gesture G while the same gesture G is executed, so that the item X directly follows the movement imparted by the user, as if it were dragged by the user's finger. Therefore, after the gesture G is executed, the item X is represented at the second position P2 (shown in dashed line in FIG. 1).

Upon recognition of the gesture G, the processing unit operates on the memory 20 to associate said determined source of information to one of said categories, based at least on the second position P2.

Preferably, the processing unit 30 calculates the distance D between the second position P2 and the reference position RP and, based on the calculated distance D, associates the determined source to one of the categories.

In particular, in memory 20 each rating value is associated with a respective possible distance or range of distances between the second position P2 and the reference position RP, as schematically shown in the table of FIG. 7, wherein the possible distances or ranges of distances D1-D6 are stored in field F 4.

Once the distance D between the second position P2 and the reference position RP has been determined, the processing unit 30 selects the rating value, and consequently the category, that are associated to that distance D, and associates the determined source represented by the item X to the selected category/rating.

FIG. 8 schematically shows a possible logic implementation of the association between some sources of information S1-S3 with a category: a table is provided, in a column of which data representative of the sources S1-S3 are stored and, on the same row, in a second column, data representative of the associated category are stored.

Preferably, the rating values are associated to the respective distances or ranges of distances according to a monotone relationship. This means that, for example, shorter distances are associated to higher ratings. From a graphical point of view this implies that the closer the second position P2 to the reference position RP, the higher the rating associated to the source represented by item X.

In a preferred embodiment, the rating associated to the determined source of information is substantially proportional to the distance D between the second position P2 and the reference position RP.

It is to be noted that only one item (namely item X) representative of a source of information has been represented in FIG. 1 for sake of clarity. However, in the representation displayed on the display 10 a higher number of items, each representative of a respective source of information, can be shown, so that the importance/interest of each source of information can be set by means of the technique disclosed herein.

The electronic device 1 comprises a receiving module RM that is adapted to receive information and data associated therewith representative of a transmitting source of said information. In practical terms the receiving module RM can be any hardware/software component which may provide the electronic device 1 with connection capabilities. The connection can be based on any suitable technology, such as for example GSM, UMTS, LTE, WiFi, etc.

Once the electronic device 1 receives, by means of the receiving module RM, at least one signal including information and source data, the latter being representative of the transmitting source of such information, the processing unit 30 compares the source data with data representative of the determined source, i.e., the source represented by item X.

If the transmitting source is the determined source associated with the item X, then the processing unit 30 selects in the memory 20 the notification data ND1-ND6 associated with the category of the determined source, and generates a notification signal based on the selected notification data.

The notification data ND1-ND6 describe how a notification of the reception of information/data from a source, associated to a certain category/rating, will be performed.

For example the notification data may specify whether a graphic alert is displayed and/or a sound is generated upon reception of said information/data.

The kind of notification that is generated thus depends on the rating (i.e., the category) associated to the source, so that information/data received from important/interesting sources will be notified in a more apparent/visible way, whereas information/data received from unimportant/dull sources will be notified in a more quiet/concealed way.

The level of importance/interest is set by the user by means of the gesture G, as herein disclosed.

By way of example, the notification data ND1-ND6 can describe how an item displayed on the display 10, and representative of a certain source of information, is shown when information/data is/are received from that source.

In practical terms, each source of information is displayed on the display 10 in a diagram as the one on FIG. 1. Each source is represented by a respective icon. The notification data ND1-ND6 describe possible graphic changes in the representation of the icons when information/data is/are received from the respective source. For example, when information/data is/are received from an important source, the respective icon can be enlarged and/or can start blinking and/or can be highlighted in other ways and/or some sounds can be generated by the electronic device 1; by contrast, when information/data is/are received from an unimportant source, the respective icon undergoes minor changes (for example, in case of the reception of an email message, a small envelope appears on or close to the icon).

Figure 11:
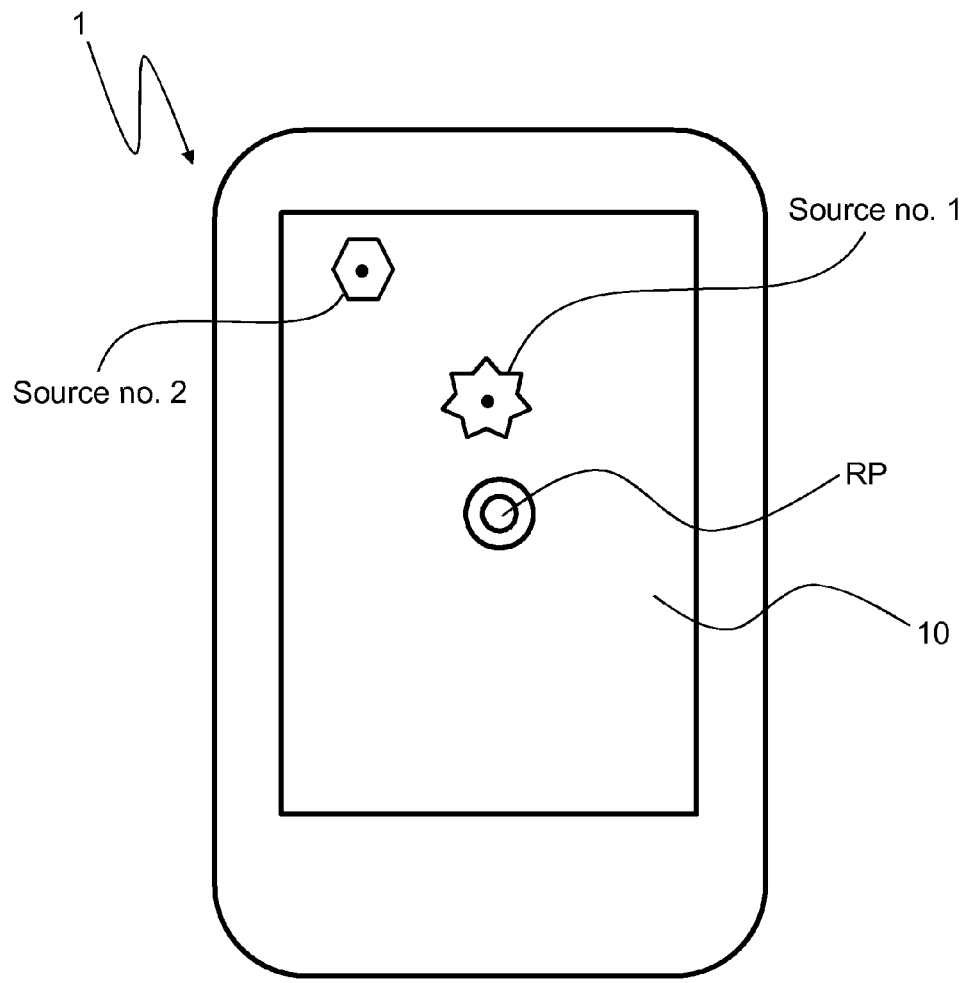
FIGS. 11-12 show an example of graphic representations according to one embodiment of the invention.

FIG. 11 shows two icons represented on the display 10: one icon (the star) is representative of Source no. 1, the other icon (the hexagon) is representative of Source no. 2.

Source no. 1 is more important/interesting than Source no. 2; in fact, the star is closer to the reference position RP than the hexagon.

Figure 12:
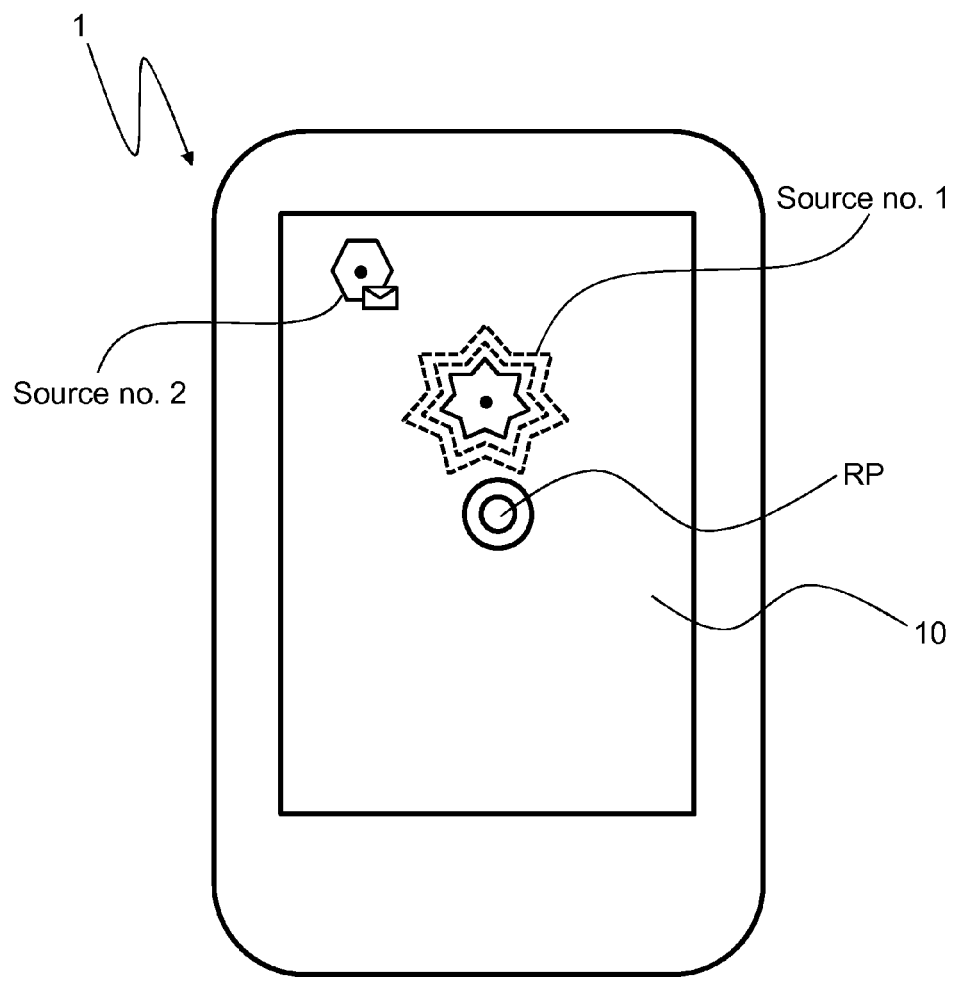

FIG. 12 shows how the reception of a message from the two sources can be represented: the icon of Source no. 1 starts blinking/flashing, while the icon of Source no. 2 is merely associated with a little envelope.

It has to be noted that the invention is not limited to these examples; several other notification techniques can be employed.

In a preferred embodiment, also the notification data ND1-ND6 can be customized by the user. Accordingly, the user can decide how important/unimportant notifications should be brought to his/her attention.

Figure 4:
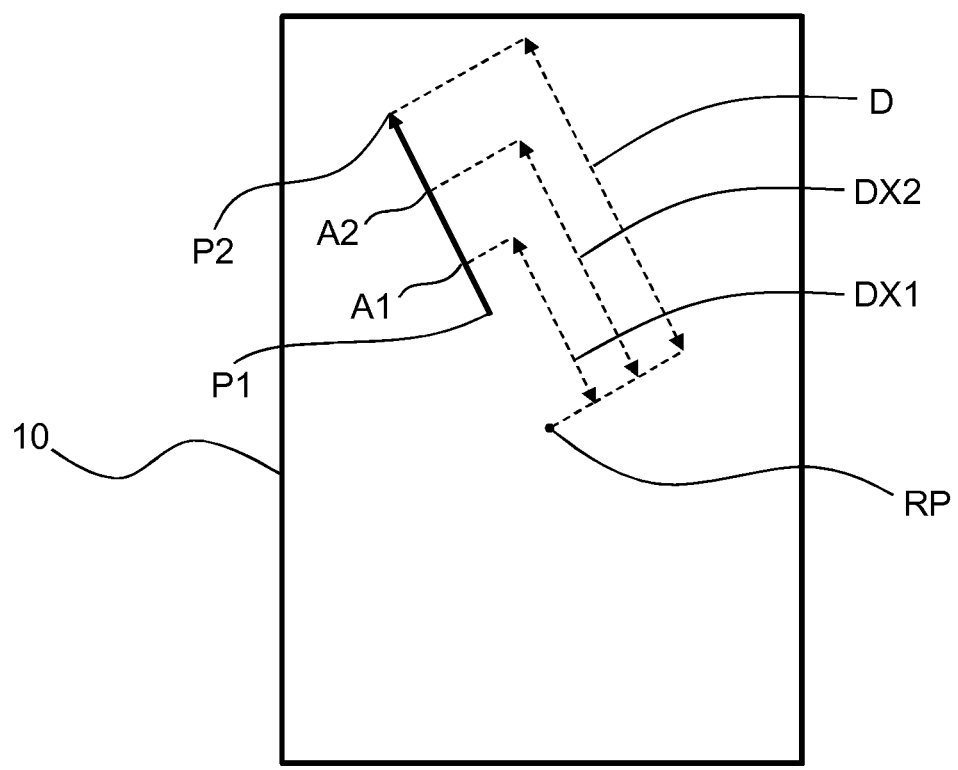

Preferably the processing unit 30 is configured to determine one or more auxiliary distances DX1, DX2 between the reference point RP and one or more auxiliary points A1, A2 of the trajectory defined by the gesture G. Advantageously the auxiliary points A1, A2 comprise points interposed between the first position and the second position P1, P2. FIG. 4 schematically shows two auxiliary points, by way of example.

For each auxiliary point A1, A2, the processing unit 30 determines auxiliary rating values associated to the respective auxiliary distances. In practical terms, for each auxiliary point A1, A2 the processing unit determines the rating that would be attributed to the determined source if the gesture G would end in that auxiliary point, i.e., if the second position P2 would coincide with that auxiliary point.

In order to determine said auxiliary rating values, the processing unit 30 can for example employ the table of FIG. 7: the auxiliary distances DX1, DX2 are compared with the distances D1-D6 in fields F4 and, when a match is found, the corresponding rating values in field(s) F2 are assumed as the auxiliary rating values.

The processing unit 30 is also configured to cooperate with the display 10 to display an indicator ID1 of each auxiliary rating value when the trajectory defined by the gesture G reaches the corresponding auxiliary point.

The indicator ID1 can be a graphic symbol, a number, a character that provides an immediate idea as to the rating that would be attributed to the source should the gesture G end in that point.

Preferably each indicator ID1 is shown when the trajectory is within a certain distance from the respective auxiliary point. Preferably each indicator ID1 is shown close the respective auxiliary point.

Figure 5:
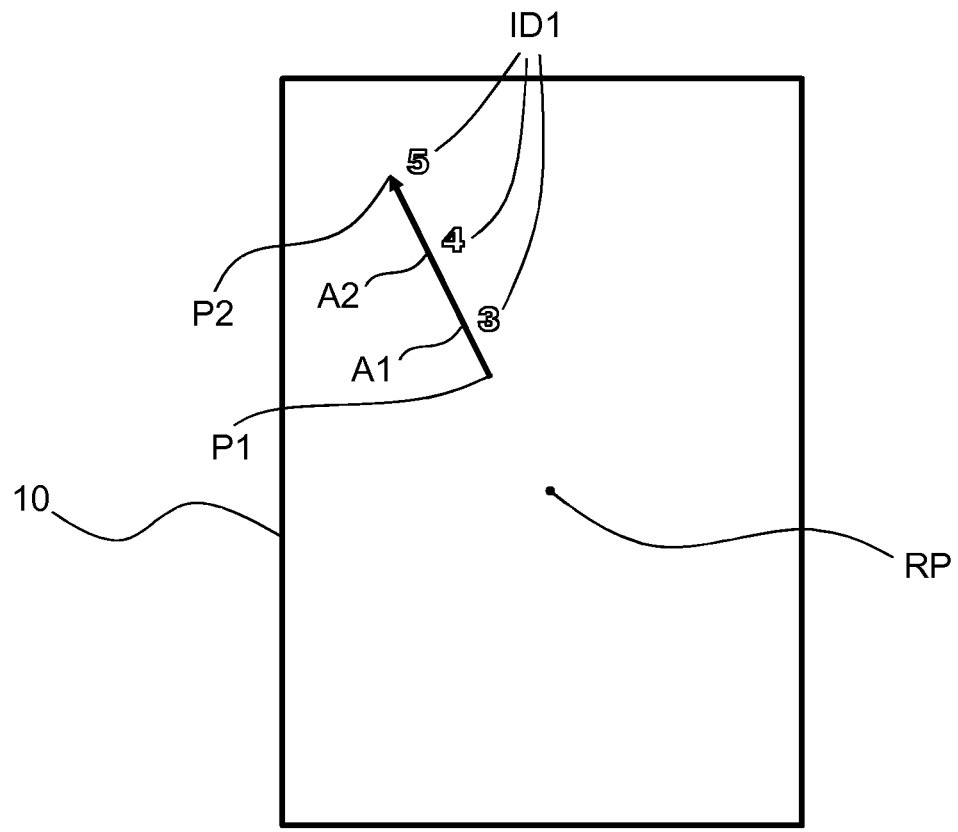
FIGS. 5, 6a, 6b, 9 show possible embodiments of the invention.

FIG. 5 shows, by way of example, two numerical indicators "3", "4" displayed close to the respective auxiliary points A1, A2. This means that, when the gesture G reaches the auxiliary point A1, the user is informed that, should the gesture G end in that point, the rating that would be given to the determined source of information is "3". The same applies to the auxiliary point A2 and the auxiliary rating value "4".

In a preferred embodiment, shown in FIG. 5, the rating indicator ID1 is represented also close to the second position P2. Actually the system does not know that the gesture G ends in the second position P2 until the user moves the finger away from the display 10. Thus the second position P2 is preferably treated as an auxiliary point during execution of the gesture G and a rating indicator ID1 is shown also close to the second position P2. In the specific example of FIG. 5, the auxiliary rating value "5" is attributed to the second position P2 and the relevant indicator ID1 is shown close to the same second position P2.

Preferably the processing unit 30 is configured to determine a direction followed by the trajectory defined by the gesture G. If the trajectory is substantially rectilinear, the direction is identified quite easily. If the trajectory is curved, it can be approximated with one or more segments, and the direction of one of the segments can be selected.

Figure 9:
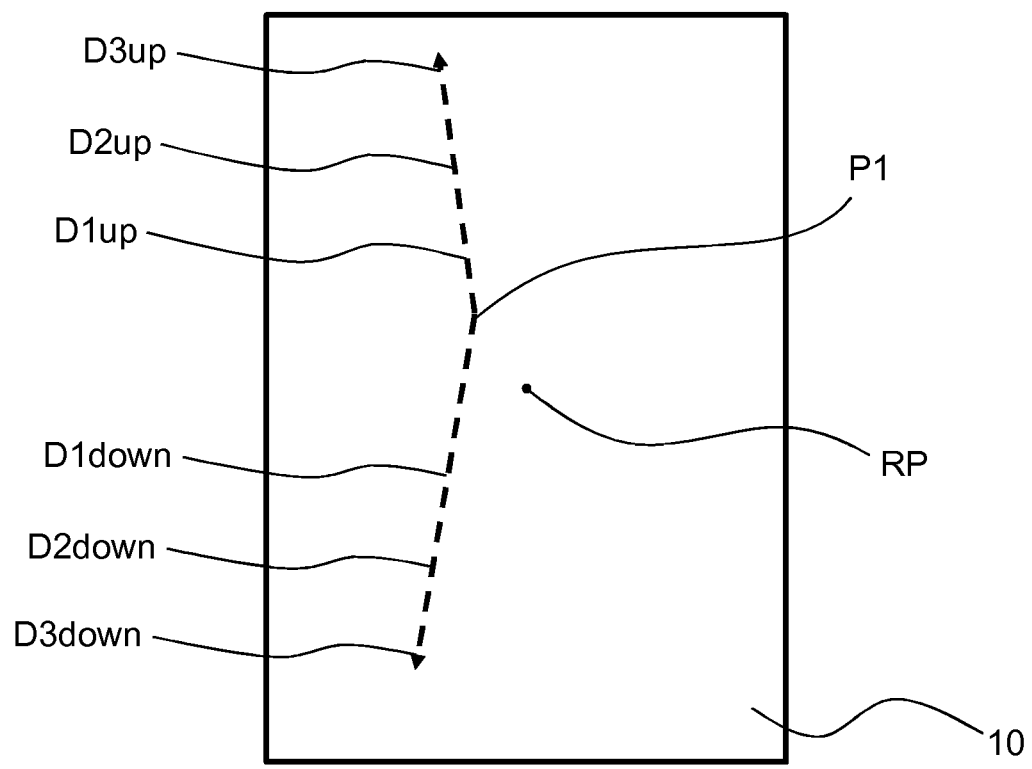

Preferably the category to which the determined source is associated is identified also based on said direction. For example, given the reference position RP in the center of the display, six categories are available: three categories are selected by respective distances D1up, D2up, D3up, which extend in the upper half of the display, whereas the remaining three categories are selected by respective distances D1down, D2down, D3down which extend in the lower half of the display. This embodiment is schematically shown in FIG. 9. FIG. 10 show, by way of example, a possible correspondence between the distances D1up-D3up, D1down-D3down and the distances D1-D6 of FIG. 7.

In a preferred embodiment, once the processing unit 30 determines the direction followed by the trajectory defined by the gesture G, it is configured to execute a determined command based on said direction.

In practical terms, the processing unit 30 is associated with a memory, which can be or can be included in the memory 20, wherein two or more commands are stored, each associated with a respective possible direction of the trajectory. The trajectory detected analyzing the gesture G is thus compared with the pre-stored directions and, once a match is found, the corresponding command is selected and executed.

Preferably the command that is executed includes one or more operations related to the determined source and/or to information received from the determined source.

Figure 6A:
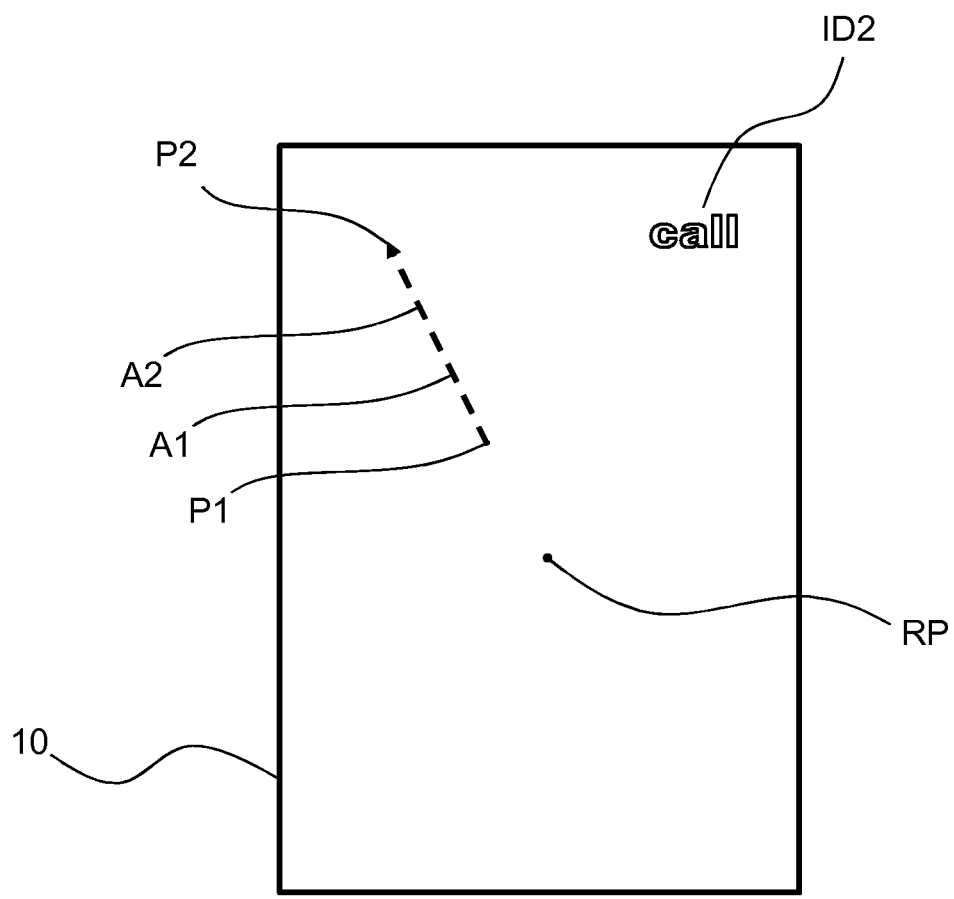
Figure 6B:
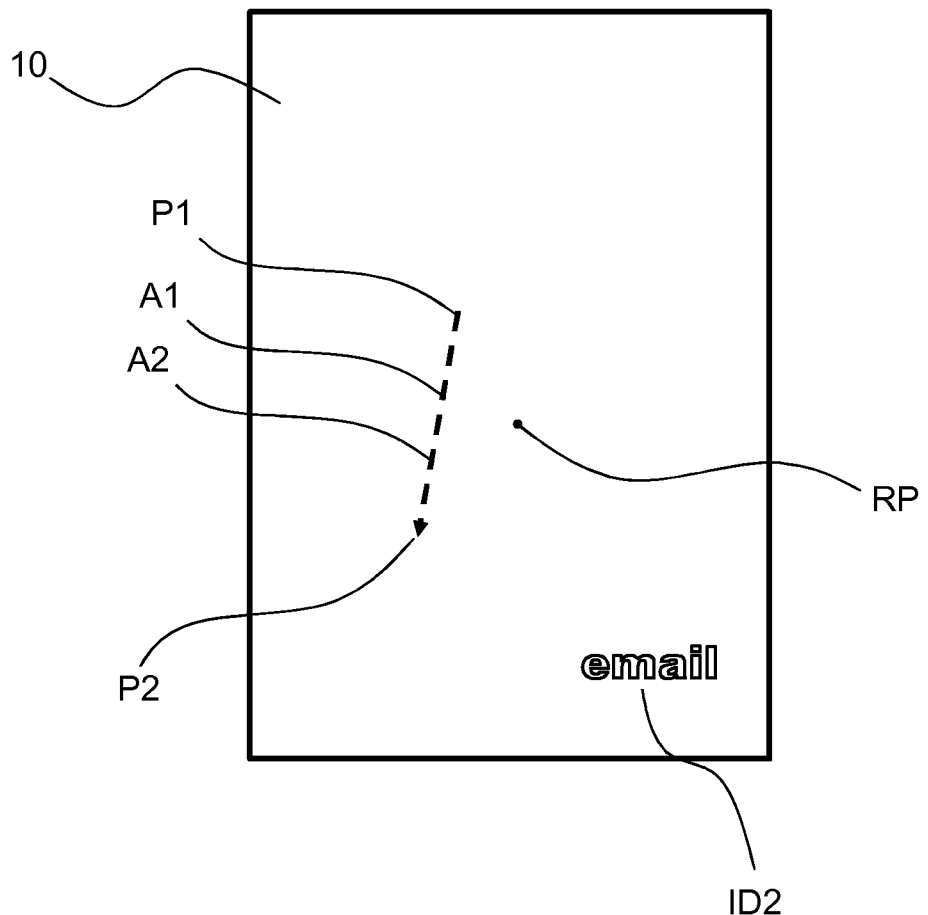

For example, if the gesture G is directed to the upper part of the display 10, then the processing unit 30 will start a telephone call to the determined source (which is, in this specific case, a person associated to a different electronic device, such as a cell phone or smart phone), whereas if the gesture G is directed to the lower part of the display 10, then the processing unit 30 will automatically activate an email application and present the user a new blank email message, ready to be sent, addressed to the determined source (see FIGS. 6a-6b).

In a preferred embodiment, the processing unit 30 is configured to cooperate with the display 10 to show on the same display 10 indicators ID2 of commands that can be executed while the trajectory of the gesture G is drawn by the user.

More in detail, for each of the aforementioned auxiliary points, the processing unit 30 determines a direction of the tract of trajectory included between the first position P1 and the relevant auxiliary point. Again, if the trajectory is not rectilinear several rectification or approximation methods can be used. Based on said direction, the processing unit determines which command is associated with the same direction, i.e., the command that would be executed if the gesture G would finish in the respective auxiliary point, and displays an indicator ID2 descriptive of that command.

In the simple example of FIGS. 6a-6b, all the auxiliary points of FIG. 6a are associated with the "call" command, while all the auxiliary points of FIG. 6b are associated with the "email" command.

It is to be noted that the processing unit 30 can be realized as a single microprocessor or a group of microprocessors cooperating in order to carry out the functions herein disclosed and claimed.

Preferably the processing unit 30, the receiving module RM and the memory 20 are part of the control circuit of which the electronic device 1 is natively provided. According to the invention such control circuit can be programmed in order to perform the operations herein disclosed and claimed.

The invention achieves important advantages. Firstly the invention provides an easy, user-friendly and reliable way to manage data received by an electronic device provided with connection capabilities, and in particular by a smart phone.

Furthermore, the invention provides a fancy and intuitive way to manage data received by an electronic device provided with connection capabilities, through which the user can easily handle large amounts of data.

What is claimed is:

1. An electronic device comprising:
 a touch-screen display;
 a memory configured to store data representative of a plurality of categories of sources of information, each of said categories being associated with respective notification data;
 a processor configured to:
  cooperate with said touch-screen display for displaying in a first position (P1) on said display an item (X) representative of a determined source of information;
  determine a reference position (RP) on said display;
  cooperate with said touch-screen display to detect a gesture (G) applied to said item (X) by a user, said gesture (G) defining on said touch-screen display a trajectory which starts in said first position (P1) and ends in a second position (P2) within said display;
  upon recognition of said gesture (G), operate on said memory to associate said determined source of information to one of said categories, based at least on said second position (P2);
 said electronic device further comprising a receiver (RM) adapted to receive information and source data associated therewith representative of a transmitting source of said information,
 wherein said processor is configured to:
  determine whether the transmitting source is the determined source associated with said item (X);
  if the transmitting source is the determined source associated with said item (X):
   select in said memory the notification data associated with a category of the determined source; and
   generate a notification signal based on the selected notification data,
  wherein said processor, in order to operate on said memory to associate said determined source of information to one of said categories, is configured to:
   calculate a distance between said second position (P2) and said reference point (RP); and
   select the category to be associated with said determined source based on said distance;
  wherein each of said categories is associated with a respective rating value representative of a rating attributed to each of said categories, wherein each of said rating values is associated with a respective possible distance or a respective possible range of distances between said second position (P2) and said reference position (RP), wherein said processor is configured to:
   select the rating associated to the calculated distance between the second position (P2) and the reference position (RP); and
   associate the determined source to the category associated with the selected rating.

2. The electronic device according to claim 1, wherein said rating values are associated to the respective distances or ranges of distances according to a monotone relationship.

3. The electronic device according to claim 1, wherein said processor is configured to:
 a. determine one or more auxiliary distances between said reference point (RP) and one or more auxiliary points of said trajectory;
 b. determine auxiliary rating values associated to each of said auxiliary distances;
 c. cooperate with said display to display an indicator of each auxiliary rating value when the trajectory reaches the respective auxiliary point.

4. The electronic device according to claim 1, wherein said processor is configured to:
 a. determine a direction followed by said trajectory;
 b. associate said determined source of information to one of said categories based also on said direction.

5. The electronic device according to claim 1, wherein said processor is configured to:
 a. determine a direction followed by said trajectory;
 b. execute a determined command based on said direction.

6. The electronic device according to claim 5, wherein said processor is configured to:
 a. identify one or more auxiliary points of said trajectory;
 b. determine an auxiliary direction followed by said trajectory in a tract delimited by said first position (P1) and each of said one or more auxiliary points;
 c. determining one or more executable commands based on said auxiliary direction(s);
 d. cooperate with said display to display information representative said one or more executable commands when said trajectory reaches the respective auxiliary point(s).

7. A method comprising:
 providing a memory configured to store data representative of a plurality of categories of sources of information, each of said categories being associated with respective notification data;
 displaying in a first position (P1) of a touch-screen display an item (X) representative of a determined source of information;
 determining a reference position (RP) on said display;
 detecting a gesture (G) applied to said item (X) by a user, said gesture (G) defining on said touch-screen display a trajectory which starts in said first position (P1) and ends in a second position (P2) within said display;
 upon recognition of said gesture (G), operating on said memory to associate said determined source of information to one of said categories, based at least on said second position (P2);
 receiving information and source data associated therewith representative of a transmitting source of said information,
 determining whether the transmitting source is the determined source associated with said item (X);
 if the transmitting source is the determined source associated with said item (X):
  selecting in said memory the notification data associated with a category of the determined source; and
  transmitting a notification signal based on the selected notification data,
 calculating a distance between said second position (P2) and said reference point (RP),
 selecting the category to be associated with said determined source based on said distance,
 wherein each of said categories is associated with a respective rating value representative of a rating attributed to each of said categories, wherein each of said rating values is associated with a respective possible distance or a respective possible range of distances between said second position (P2) and said reference position (RP), said method further comprising:

selecting the rating associated to the calculated distance between the second position (P2) and the reference position (RP); and associating the determined source to the category associated with the selected rating.

8. The method according to claim 7, wherein said rating values are associated to the respective distances or ranges of distances according to a monotone relationship.

9. The method according to claim 7, comprising:
determining one or more auxiliary distances between said reference point (RP) and one or more auxiliary points of said trajectory;
determining auxiliary rating values associated to each of said auxiliary distances; cooperating with said display to display an indicator of each auxiliary rating value when the trajectory reaches the respective auxiliary point.

10. The method according to claim 7, comprising:
determining a direction followed by said trajectory;
associating said determined source of information to one of said categories based also on said direction.

11. The method according to claim 7, comprising:
determining a direction followed by said trajectory;
executing a determined command based on said direction.

12. The method according to claim 11, comprising:
identifying one or more auxiliary points of said trajectory;
determining an auxiliary direction followed by said trajectory in a tract delimited by said first position (P1) and each of said one or more auxiliary points;
determining one or more executable commands based on said auxiliary direction(s);
displaying information representative said one or more executable commands when said trajectory reaches the respective auxiliary point(s).

13. A non-transitory computer readable storage medium storing one or more programs comprising instructions, which when executed by an electronic device provided with a memory configured to store data representative of a plurality of categories of sources of information, each of said categories being associated with respective notification data, cause the device to:
display in a first position (P1) of a touch-screen display an item (X) representative of a determined source of information;
determine a reference position (RP) on said display;
detect a gesture (G) applied to said item (X) by a user, said gesture (G) defining on said touch-screen display a trajectory which starts in said first position (P1) and ends in a second position (P2) within said display;
upon recognition of said gesture (G), operate on said memory to associate said determined source of information to one of said categories, based at least on said second position (P2);
receive information and source data associated therewith representative of a transmitting source of said information,
determine whether the transmitting source is the determined source associated with said item (X);
if the transmitting source is the determined source associated with said item (X):
select in said memory the notification data associated with the category of the determined source; and
transmit a notification signal based on the selected notification data, said instructions further causing said device to:
calculate a distance between said second position (P2) and said reference point (RP); and select the category to be associated with said determined source based on said distance,
wherein each of said categories is associated with a respective rating value representative of a rating attributed to each of said categories, wherein each of said rating values is associated with a respective possible distance or a respective possible range of distances between said second position (P2) and said reference position (RP), said instructions further causing said device to:
select the rating associated to the calculated distance between the second position (P2) and the reference position (RP); and
associate the determined source to the category associated with the selected rating.

14. An electronic device comprising:
a touch-screen display;
a memory configured to store data representative of a plurality of categories of sources of information, each of said categories being associated with respective notification data;
a processor configured to:
cooperate with said touch-screen display for displaying in a first position (P1) on said display an item (X) representative of a determined source of information;
determine a reference position (RP) on said display;
cooperate with said touch-screen display to detect a gesture (G) applied to said item (X) by a user, said gesture (G) defining on said touch-screen display a trajectory which starts in said first position (P1) and ends in a second position (P2) within said display;
upon recognition of said gesture (G), operate on said memory to associate said determined source of information to one of said categories, based at least on said second position (P2);
said electronic device further comprising a receiver (RM) adapted to receive information and source data associated therewith representative of a transmitting source of said information,
wherein said processor is configured to:
determine whether the transmitting source is the determined source associated with said item (X);
if the transmitting source is the determined source associated with said item (X):
select in said memory the notification data associated with the category of the determined source; and
generate a notification signal based on the selected notification data
wherein said processor is configured to:
determine a direction followed by said trajectory; and
execute a determined command based on said direction,
wherein said processor is configured to:
identify one or more auxiliary points of said trajectory;
determine an auxiliary direction followed by said trajectory in a tract delimited by said first position (P1) and each of said one or more auxiliary points;
determine one or more executable commands based on said auxiliary direction(s);
cooperate with said display to display information representative of said one or more executable commands when said trajectory reaches the respective auxiliary point(s).

15. A method comprising:
providing a memory configured to store data representative of a plurality of categories of sources of information, each of said categories being associated with respective notification data;

displaying in a first position (P1) of a touch-screen display an item (X) representative of a determined source of information;
determining a reference position (RP) on said display;
detecting a gesture (G) applied to said item (X) by a user, said gesture (G) defining on said touch-screen display a trajectory which starts in said first position (P1) and ends in a second position (P2) within said display;
upon recognition of said gesture (G), operating on said memory to associate said determined source of information to one of said categories, based at least on said second position (P2);
receiving information and source data associated therewith representative of a transmitting source of said information,
determining whether the transmitting source is the determined source associated with said item (X);
if the transmitting source is the determined source associated with said item (X):
 selecting in said memory the notification data associated with the category of the determined source; and
 transmitting a notification signal based on the selected notification data,
said method further comprising:
 determining a direction followed by said trajectory; and
 executing a determined command based on said direction, said method further comprising:
 identifying one or more auxiliary points of said trajectory;
 determining an auxiliary direction followed by said trajectory in a tract delimited by said first position (P1) and each of said one or more auxiliary points;
 determining one or more executable commands based on said auxiliary direction(s); and
 displaying information representative of said one or more executable commands when said trajectory reaches the respective auxiliary point(s).

16. A non-transitory computer readable storage medium storing one or more programs comprising instructions, which when executed by an electronic device provided with a memory configured to store data representative of a plurality of categories of sources of information, each of said categories being associated with respective notification data, cause the device to:
 display in a first position (P1) of a touch-screen display an item (X) representative of a determined source of information;
 determine a reference position (RP) on said display;
 detect a gesture (G) applied to said item (X) by a user, said gesture (G) defining on said touch-screen display a trajectory which starts in said first position (P1) and ends in a second position (P2) within said display;
 upon recognition of said gesture (G), operate on said memory to associate said determined source of information to one of said categories, based at least on said second position (P2);
 receive information and source data associated therewith representative of a transmitting source of said information,
 determine whether the transmitting source is the determined source associated with said item (X);
 if the transmitting source is the determined source associated with said item (X):
 select in said memory the notification data associated with the category of the determined source; and
 transmit a notification signal based on the selected notification data,
said instructions further causing said device to:
 determine a direction followed by said trajectory; and
 execute a determined command based on said direction,
said instructions further causing said device to:
 identify one or more auxiliary points of said trajectory;
 determine an auxiliary direction followed by said trajectory in a tract delimited by said first position (P1) and each of said one or more auxiliary points;
 determine one or more executable commands based on said auxiliary direction(s); and
 display information representative of said one or more executable commands when said trajectory reaches the respective auxiliary point(s).

* * * * *